United States Patent
Saito

(10) Patent No.: US 10,746,974 B2
(45) Date of Patent: Aug. 18, 2020

(54) OPTICAL SYSTEM AND IMAGING APPARATUS INCLUDING THE SAME

(71) Applicant: CANON KABUSHIKI KAISHA, Tokyo (JP)

(72) Inventor: Shinichiro Saito, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 155 days.

(21) Appl. No.: 16/131,563

(22) Filed: Sep. 14, 2018

(65) Prior Publication Data

US 2019/0094503 A1 Mar. 28, 2019

(30) Foreign Application Priority Data

Sep. 28, 2017 (JP) .................................. 2017-188935

(51) Int. Cl.
 G02B 13/02 (2006.01)
 G02B 27/00 (2006.01)
 G02B 9/64 (2006.01)

(52) U.S. Cl.
 CPC ............... *G02B 13/02* (2013.01); *G02B 9/64* (2013.01); *G02B 27/0025* (2013.01)

(58) Field of Classification Search
 CPC .......... G02B 13/02; G02B 13/22; G02B 9/64; G02B 13/0045; G02B 13/18; G02B 27/0025; G02B 9/12; G02B 9/34; G02B 9/60; G02B 9/62
 USPC .................................................. 359/754–757
 See application file for complete search history.

(56) References Cited

U.S. PATENT DOCUMENTS

| | | | |
|---|---|---|---|
| 2012/0229921 A1* | 9/2012 | Eguchi | G02B 15/163 359/771 |
| 2016/0077310 A1* | 3/2016 | Sudoh | G02B 9/60 359/764 |
| 2018/0024315 A1 | 1/2018 | Sato | |
| 2018/0373004 A1* | 12/2018 | Yasui | G02B 15/167 |
| 2020/0026047 A1* | 1/2020 | Hosoi | G02B 7/36 |

FOREIGN PATENT DOCUMENTS

JP 2015-148670 A 8/2015
JP 2016-212288 A 12/2016

* cited by examiner

*Primary Examiner* — Jordan M Schwartz
(74) *Attorney, Agent, or Firm* — Canon U.S.A., Inc. IP Division

(57) ABSTRACT

An optical system includes a positive lens G1 arranged closest to the object side and a positive lens G2 arranged closest to the object side among positive lenses at the image side of the positive lens G1. The optical system satisfies a predetermined condition.

20 Claims, 13 Drawing Sheets

OPTICAL SYSTEM AND IMAGING APPARATUS INCLUDING THE SAME

BACKGROUND

Field of the Disclosure

The present disclosure relates to an optical system that is suitable for an imaging apparatus such as a digital video camera, a digital still camera, a broadcasting camera, a silver-halide-film camera, or a monitoring camera.

Description of the Related Art

A telephoto-type optical system with a long focal length, is expected to have a light weight and high optical performance for accurately correcting various aberrations such as chromatic aberration.

In Japanese Patent Laid-Open No. 2015-148670, a telephoto-type optical system providing the widest gap between two negative lenses in a first lens unit and using low dispersion glass for a positive lens closest to an object side in the first lens unit is described. The configuration described in Japanese Patent Laid-Open No. 2015-148670 enables both chromatic aberration correction and reduction in a size of a lens.

In a telephoto-type optical system, contribution of each lens with respect to a weight of the entire optical system is larger as being arranged closer to an object side. However, in the optical system described in Japanese Patent Laid-Open No. 2015-148670, a plurality of lenses are arranged on the object side with the widest gap in the first lens unit, and an effective diameter of each of the lenses are relatively large. Thus, there is a possibility that it becomes difficult to sufficiently reduce a weight of the optical system with the configuration described in Japanese Patent Laid-Open No. 2015-148670.

SUMMARY

The current disclosure provides an optical system which has a light weight and provides accurate correction for various aberrations such as chromatic aberration.

An aspect of the disclosure provides an optical system including a positive lens G1 arranged closest to an object side and a positive lens G2 arranged closest to the object side among a plurality of positive lenses at an image side of the positive lens G1. The optical system satisfies the following conditions:

$LD/f<1.000$ $82.73<vdA$ $0.200<D12/LD<0.600$ where LD is a distance on an optical axis from an object-side surface of the positive lens G1 to an image plane of the optical system, f is a focal length of the optical system, vdA is a value obtained by averaging an Abbe number of the positive lens G1 and an Abbe number of the positive lens G2, and D12 is a distance on the optical axis from a lens arranged adjacent to the positive lens G1 on the image side to the positive lens G1.

Another aspect of the disclosure provides an optical system including a positive lens G1 arranged closest to an object side and a positive lens G2 arranged closest to the object side among a plurality of positive lenses at an image side of the positive lens G1. The optical system satisfies the following conditions:

$LD/f<1.000$ $73.00<vdG1$ $73.00<vdG2$ $0.200<D12/LD<0.600$ where LD is a distance on an optical axis from an object-side surface of the positive lens G1 to an image plane of the optical system, f is a focal length of the optical system, vdG1 is an Abbe number of the positive lens G1, vdG2 is an Abbe number of the positive lens G2, and D12 is a distance on the optical axis from a lens arranged adjacent to the positive lens G1 on the image side to the positive lens G1.

Still another aspect of the disclosure provides an imaging apparatus including an optical system and an image sensor that receives light of an image formed by the optical system. The optical system includes a positive lens G1 arranged closest to an object side and a positive lens G2 arranged closest to the object side among a plurality of positive lenses at an image side of the positive lens G1. The optical system satisfies the following conditions:

$LD/f<1.000$ $82.73<vdA$ $0.200<D12/LD<0.600$ where LD is a distance on an optical axis from an object-side surface of the positive lens G1 to an image plane of the optical system, f is a focal length of the optical system, vdA is a value obtained by averaging an Abbe number of the positive lens G1 and an Abbe number of the positive lens G2, and D12 is a distance on the optical axis from a lens arranged adjacent to the positive lens G1 on the image side to the positive lens G1.

Further features of the present disclosure will become apparent from the following description of exemplary embodiments with reference to the attached drawings.

DESCRIPTION OF THE EMBODIMENTS

Figure 1:
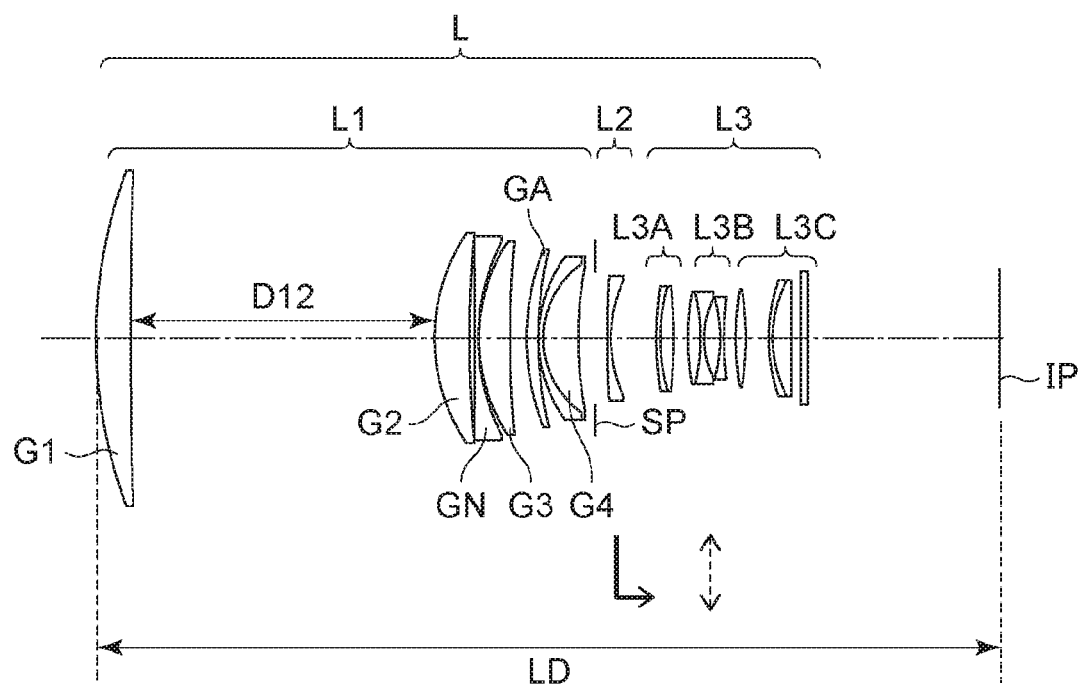
FIG. 1 is a sectional view of an optical system of Embodiment 1.
Figure 2:
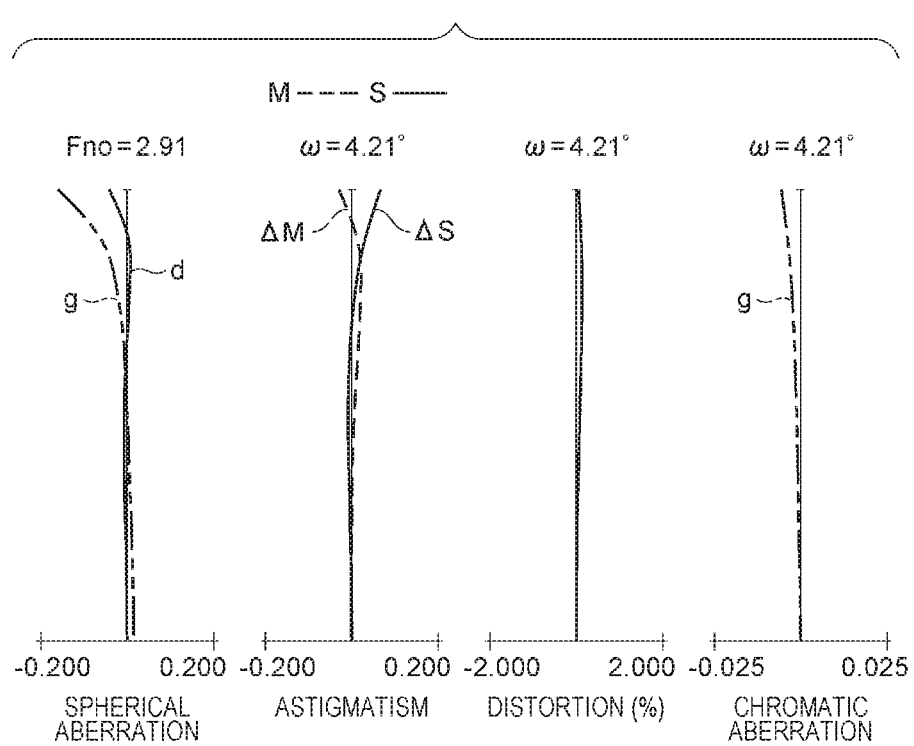
FIG. 2 is an aberration chart of the optical system of Embodiment 1.
Figure 3:
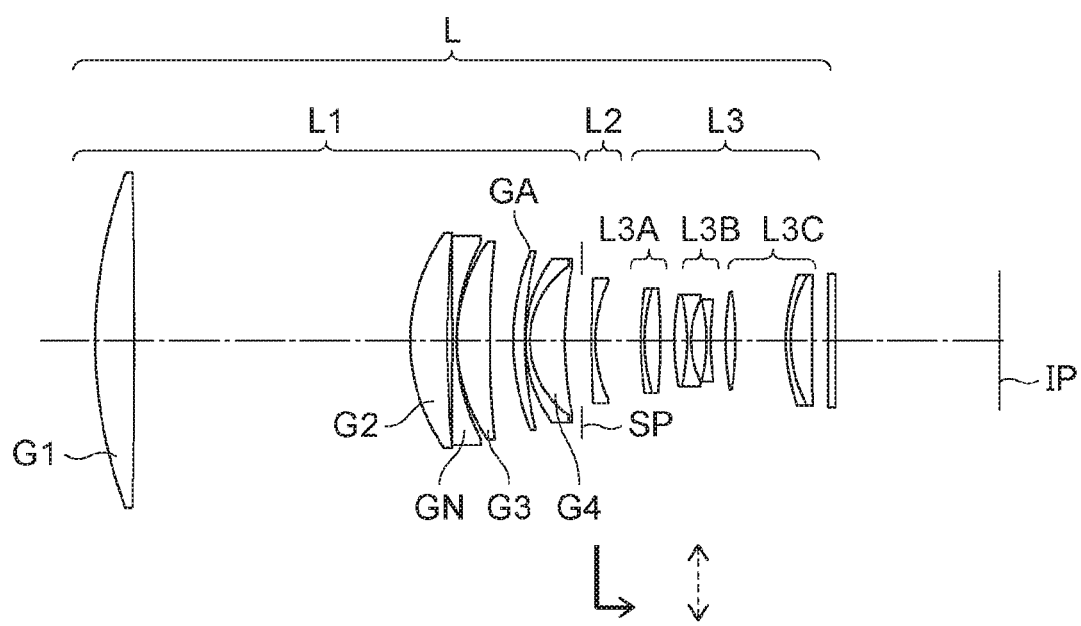
FIG. 3 is a sectional view of an optical system of Embodiment 2.
Figure 4:
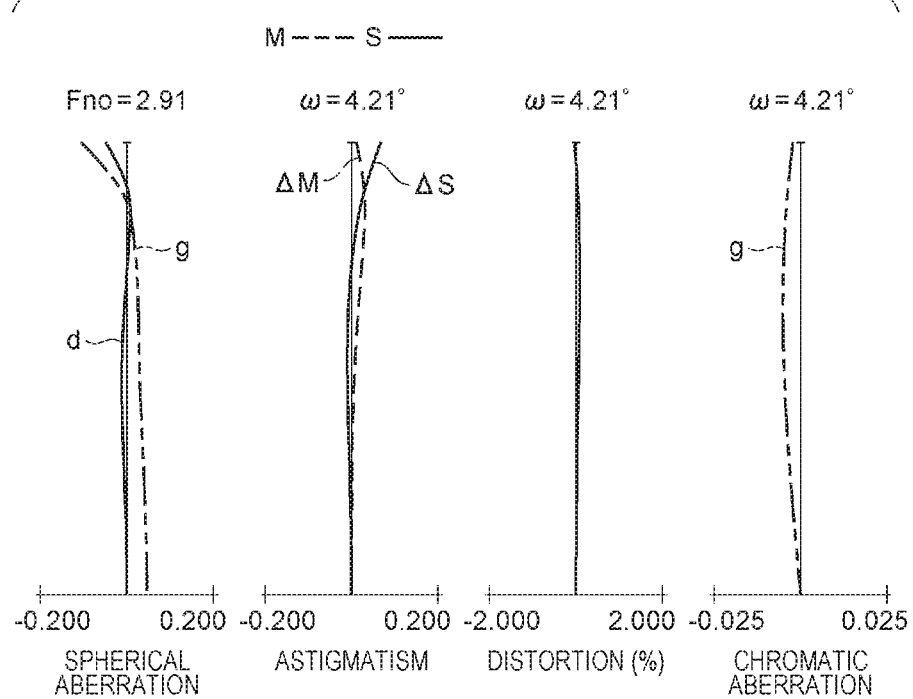
FIG. 4 is an aberration chart of the optical system of Embodiment 2.
Figure 5:
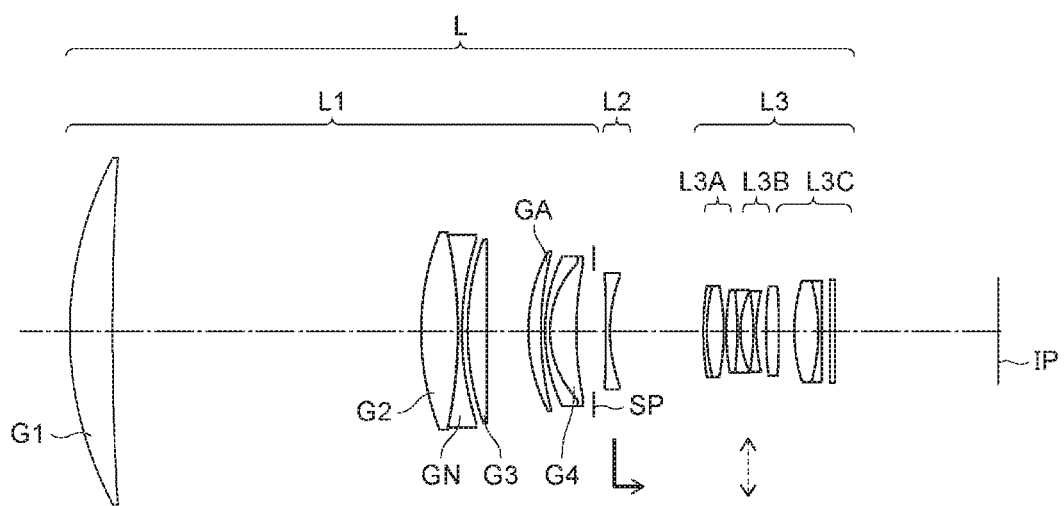
FIG. 5 is a sectional view of an optical system of Embodiment 3.
Figure 6:
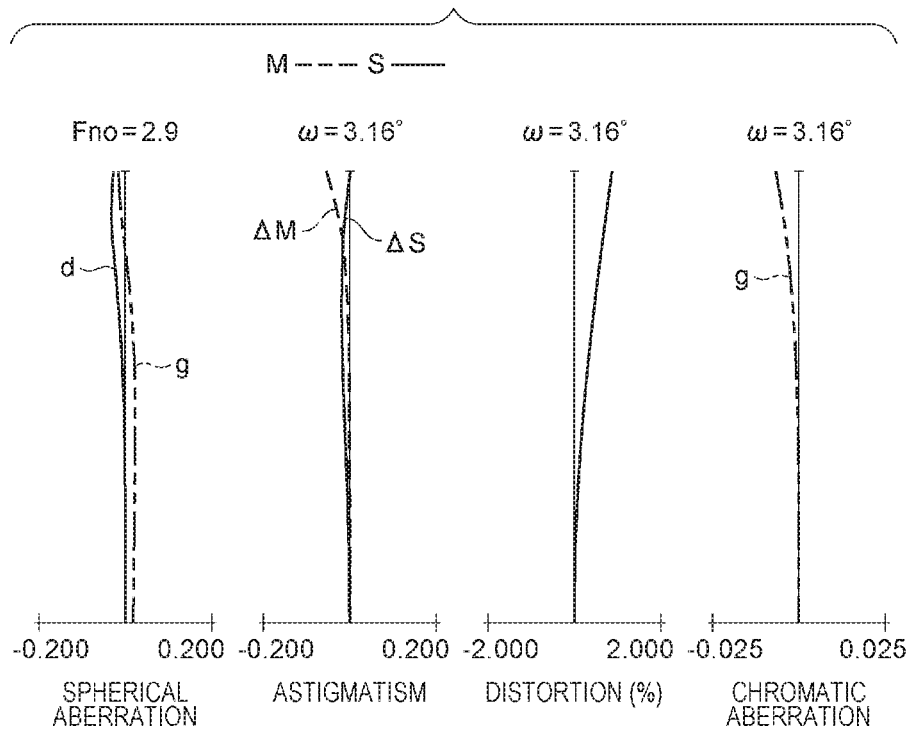
FIG. 6 is an aberration chart of the optical system of Embodiment 3.
Figure 7:
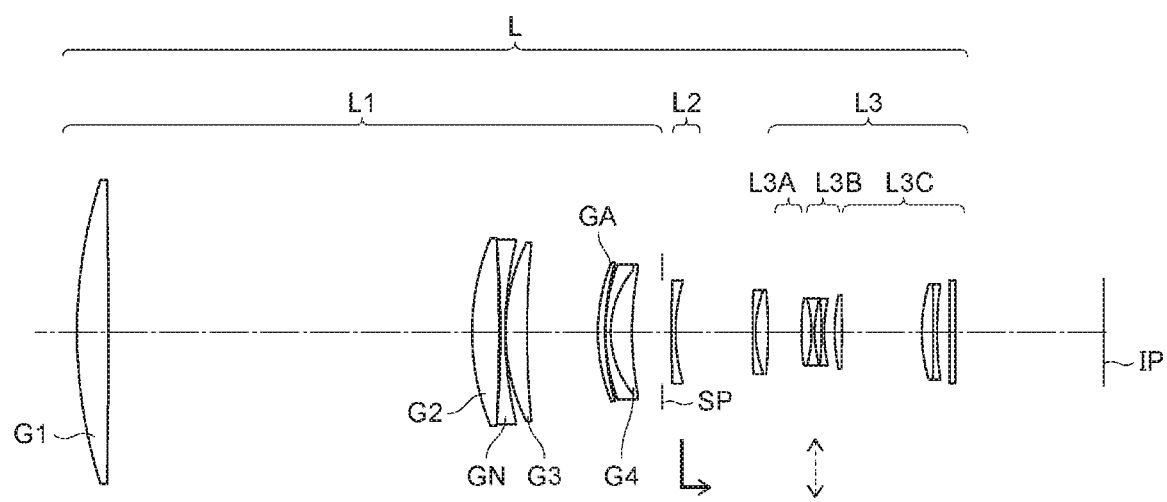
FIG. 7 is a sectional view of an optical system of Embodiment 4.
Figure 8:
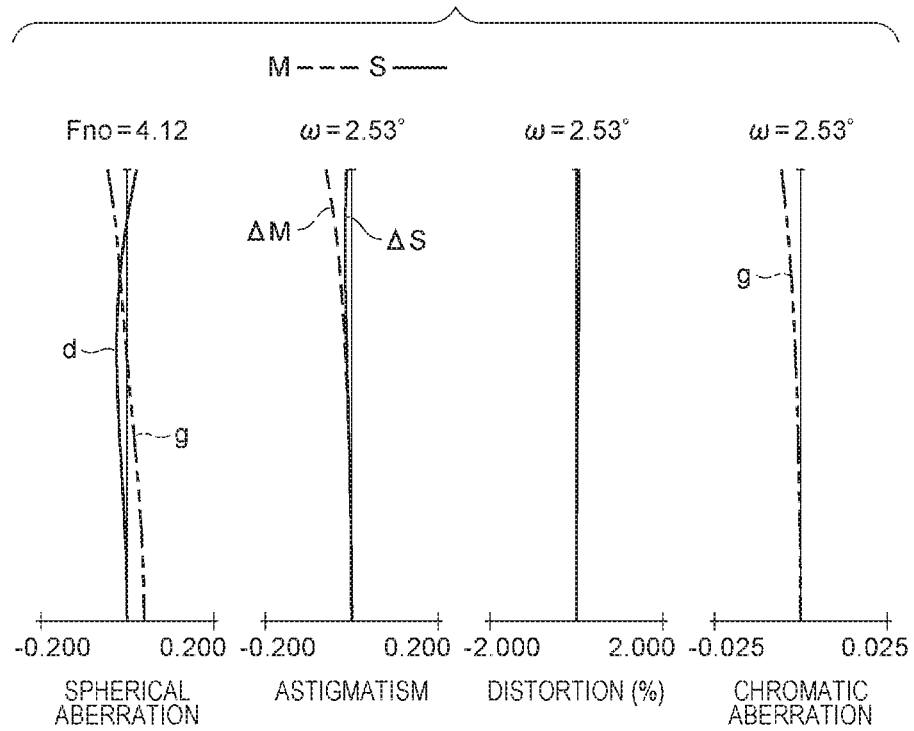
FIG. 8 is an aberration chart of the optical system of Embodiment 4.
Figure 9:
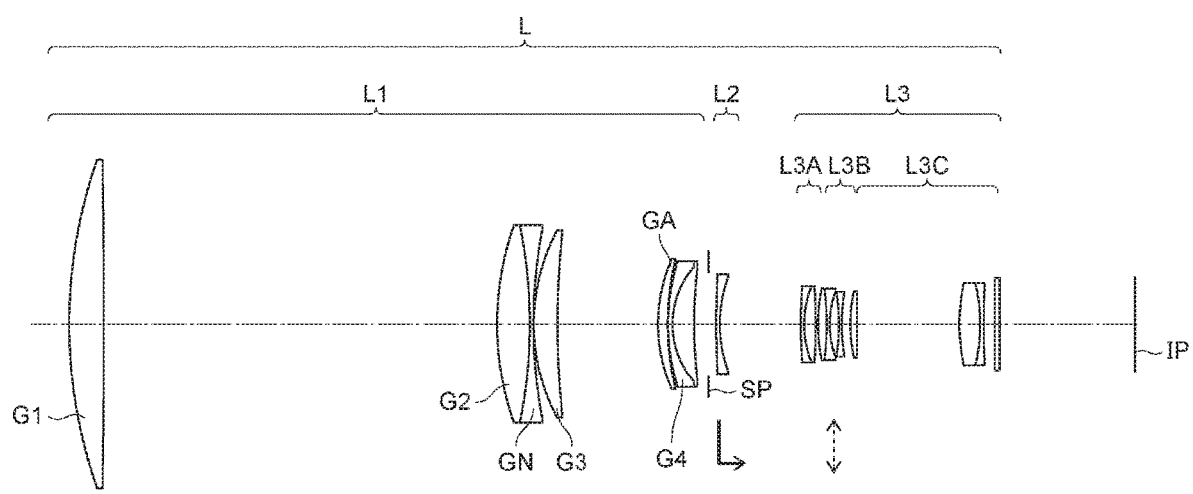
FIG. 9 is a sectional view of an optical system of Embodiment 5.
Figure 10:
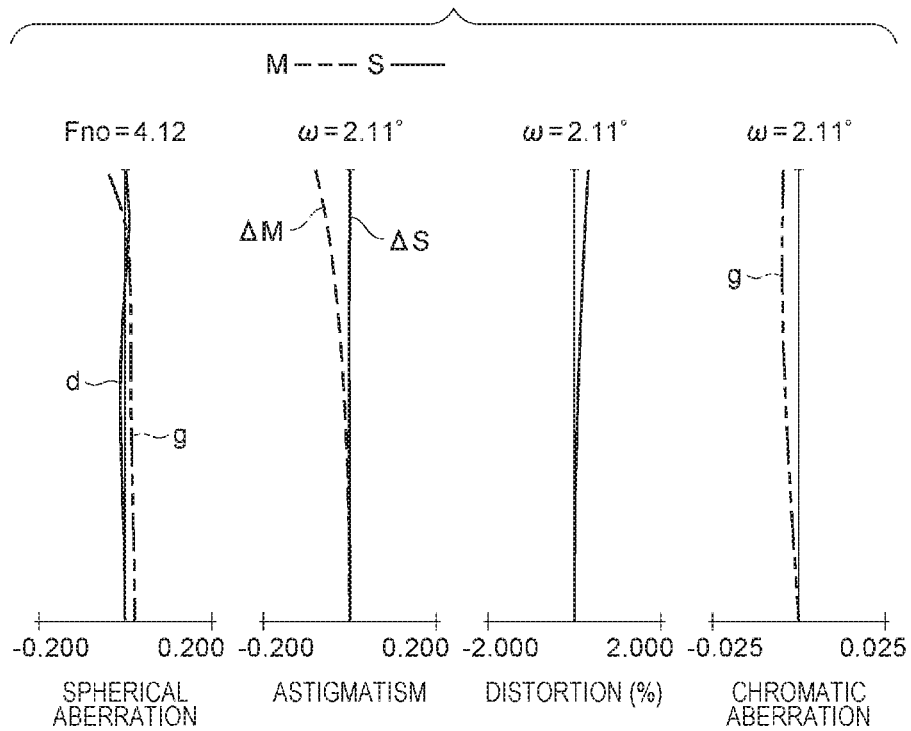
FIG. 10 is an aberration chart of the optical system of Embodiment 5.
Figure 11:
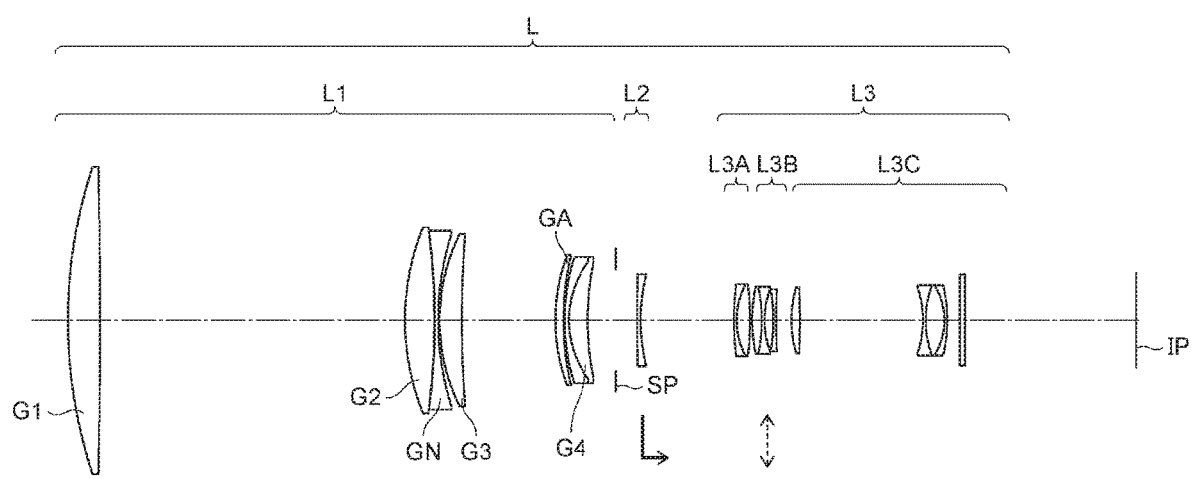
FIG. 11 is a sectional view of an optical system of Embodiment 6.
Figure 12:
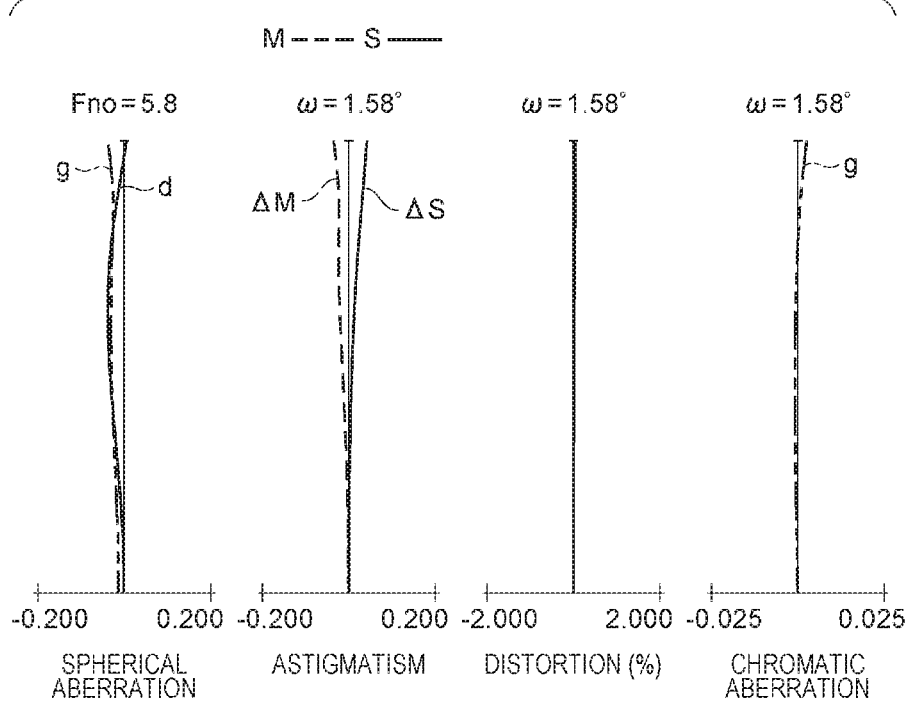
FIG. 12 is an aberration chart of the optical system of Embodiment 6.

Hereinafter, Embodiments of optical systems of the disclosure and an imaging apparatus including the same will be described with references to the attached drawings. A "refractive index" in the description below means a refractive index with respect to a d-line as long as a wavelength is not particularly prescribed.

FIGS. 1, 3, 5, 7, 9, and 11 respectively illustrate sectional views of lenses of optical systems of Embodiments 1 to 6.

An optical system L of each of Embodiments is an image pickup optical system used in an imaging apparatus such as a digital still camera, a video camera, a silver-halide-film camera, or a broadcasting camera. In each of the sectional views of the lenses, an object side (enlargement side) is on the left and an image side (reduction side) is on the right.

The optical system L of each of Embodiments includes a first lens unit L1 having positive refractive power, a second lens unit L2 having positive or negative refractive power, and a third lens unit L3 having positive or negative refractive power arranged in order from the object side to the image side. During focusing, the second lens unit L2 moves, and the gap between each pair of adjacent lens units changes. Each of the lens units in the present application is a component of the optical system L including one or a plurality of lenses.

The first lens unit L1 is configured to include at least two positive lenses. In description below, a positive lens arranged closest to the object side is set as a positive lens G1 and a positive lens of a plurality of positive ranges arranged on the image side closest to the positive lens G1 is set as a positive lens G2. That is, the positive lens G1 is a positive lens arranged closest to the object side in the optical system L, and the positive lens G2 is a positive lens arranged at a position closest to the positive lens G1 among positive lenses arranged on the image side in the optical system L. The positive lenses included in the first lens unit L1 may include only the positive lens G1 and the positive lens G2.

A cover glass (protective glass) that does not substantially have refractive power may be provided on the object side of the positive lens G1. In other words, an optical member that is arranged closest to the object side in the optical system L and does not substantially have refractive power is not regarded as the positive lens G1 in the present application. "Does not substantially have refractive power" means that, for example, an absolute value of refractive power is equal to or less than one fifth of refractive power of the entire optical system L.

An aperture diaphragm SP determines (restricts) a diameter of a light flux of a maximum aperture (Fno). In a case where the optical system L of each of Embodiments is used for a video camera or a digital still camera, an image plane of a solid-state image sensor (photoelectric conversion element) of a CCD, a CMOS sensor, or the like is arranged on an image plane IP. Moreover, in a case where the optical system L of each of Embodiments is used for a silver-halide-film camera, a photosensitive surface corresponding to a film surface is arranged on the image plane IP.

An arrow in a bold solid line in each of the sectional views indicates a moving direction of the second lens unit L2 during focusing from infinity to a short distance.

FIGS. 2, 4, 6, 8, 10, and 12 respectively illustrate aberration charts of the optical system L of Embodiments 1 to 6 during focusing at infinity.

In each of the aberration charts, Fno denotes an F-number and ω denotes a half field angle which is a field angle obtained by paraxial calculation. In a spherical aberration chart, d indicates a d-line (wavelength of 587.56 nm) and g indicates a g-line (wavelength of 435.835 nm).

In an astigmatism chart, ΔS indicates a d-line on a sagittal image plane and ΔM indicates a d-line on a meridional image plane. Distortion aberration indicates an amount of distortion aberration of the d-line. In a magnification chromatic aberration chart, g indicates an amount of chromatic aberration of the g-line with respect to the d-line.

Next, a feature of the optical system L of each of Embodiments will be described.

In general, the longer focal length of an optical system tends to result in increase of chromatic aberration. Therefore, for a telephoto-type optical system, it is important to accurately correct chromatic aberration.

Moreover, the longer focal length of an optical system tends to result in increase of a size of a first lens unit having positive refractive power. In the telephoto-type optical system, as a lens is arranged closer to an object side, an incident height of an axial ray becomes higher and an effective diameter increases. Consequently, from the aspect of chromatic aberration correction, it is desired that a plurality of positive lenses made of a low dispersion material are arranged at positions closer to an object in the first lens unit.

However, with respect to weight reduction, a reduced effective diameter of a lens included in the first lens unit is desired since a volume (mass) of the lens is approximately proportional to a cube of the effective diameter.

Then, in the optical system L of each of Embodiments, a gap between the positive lens G1 and a lens arranged adjacent to the positive lens G1 and Abbe numbers of the positive lens G1 and the positive lens G2 are appropriately set. Specifically, the optical system L of each of Embodiments satisfies all of the following conditions (1), (2), and (3).

$$LD/f < 1.000 \quad (1)$$

$$0.200 < D12/LD < 0.600 \quad (2)$$

$$82.73 < vdA \quad (3)$$

Here, LD denotes a total length of the optical system L. The total length of the optical system L is a distance on an optical axis from an object-side lens surface of the positive lens G1 to the image plane. That is, LD is a value obtained by adding back focus (back focal distance) to a distance between a surface vertex of the object-side lens surface of the positive lens G1 and a surface vertex of an image-side lens surface of a lens arranged closest to the image side in the optical system L. A focal length of the optical system L is denoted by f. A value obtained by averaging the Abbe number of the positive lens G1 and the Abbe number of the positive lens G2 is denoted by vdA. That is, vdA is obtained by vdA=(vdG1+vdG2)/2, when the Abbe number of the positive lens G1 is vdG1 and the Abbe number of the positive lens G2 is vdG2. A distance on the optical axis between the positive lens G1 and a lens arranged adjacent to the positive lens G1 on the image side is denoted by D12. That is, D12 is a distance between a surface vertex of an object-side lens surface of the lens arranged adjacent to the positive lens G1 on the image side and a surface vertex of an image-side lens surface of the positive lens G1.

An Abbe number (vd) in the present application is an amount defined by Expression (A) below when refractive indexes of a d-line, an F-line, and a C-line of Fraunhofer lines are set as Nd, NF, and NC, respectively.

$$vd=(Nd-1)/(NF-NC) \quad (A)$$

Expression (1) indicates that the total length of the optical system L is shorter than the focal length of the optical system L. When it is configured that the total length of the optical system L is longer than the focal length, it is easy to correct axial chromatic aberration and magnification chromatic aberration with good balance. However, when LD is made so large as to exceed an upper limit of Expression (1), although there is an advantage from a viewpoint of aberration correction, the optical system L becomes too large, thus making it difficult to configure the optical system L with a light weight. Furthermore, enlargement of the optical system L is not desired since a lens barrel that supports the optical system L also becomes large and thus a weight of an entire lens apparatus including the optical system L increases.

Expression (2) defines a gap between the positive lens G1 and the lens arranged adjacent to the positive lens G1 on the image side. When Expression (2) is satisfied, it is possible to reduce a diameter of the lens arranged closer to the image side than the positive lens G1, thus making it possible to reduce the weight of the optical system L.

When D12 becomes so large as to exceed an upper limit of Expression (2), the reduction in the weight of the optical system L is facilitated, but it becomes difficult to correct distortion aberration and magnification chromatic aberration.

When D12 becomes so small as to fall below a lower limit of Expression (2), although there is an advantage from the viewpoint of aberration correction, an effective diameter of the lens arranged closer to the image side than the positive lens G1 becomes large, thus making it difficult to reduce the weight of the optical system L.

A range of Expression (2) is preferably set to be a range of Expression (2a) below, and more preferably set to be a range of Expression (2b) below.

$$0.250<D12/LD<0.580 \quad (2a)$$

$$0.280<D12/LD<0.500 \quad (2b)$$

Expression (3) defines the Abbe numbers of the positive lens G1 and the positive lens G2 on the d-line included in the first lens unit L1. When Expressions (1) and (2) are satisfied and Expression (3) is also satisfied, it is possible to accurately correct various aberrations including chromatic aberration, while reducing the weight of the optical system L.

When vdA becomes so small as to fall below a lower limit of Expression (3), a generation amount of chromatic aberration due to the positive lens G1 and the positive lens G2 increases too much, thus making it difficult for the entire optical system L to correct various aberrations including the chromatic aberration with good balance.

Because of a characteristic of an optical material, a refractive index becomes smaller as an Abbe number becomes larger. Therefore, when vdA becomes large, although it is advantageous to suppress axial chromatic aberration, it becomes difficult to apply desired refractive power to the positive lens G1 and the positive lens G2 with appropriate curvature, resulting in increase of a generation amount of spherical aberration or comatic aberration. Thus, a range of Expression (3) is preferably set to be a range of Expression (3a) below, and more preferably set to be a range of Expression (3b) below.

$$82.75<vdA<98.00 \quad (3a)$$

$$83.00<vdA<96.00 \quad (3b)$$

The optical system L may be configured to satisfy both of Expressions (3-1) and (3-2) below instead of Expression (3).

$$73.00<vdG1 \quad (3-1)$$

$$73.00<vdG2 \quad (3-2)$$

Expression (3-1) defines the Abbe number of the positive lens G1. Expression (3-2) defines the Abbe number of the positive lens G2. Also by satisfying Expressions (1) and (2) and both of Expressions (3-1) and (3-2) in addition, it is possible to accurately correct various aberrations including chromatic aberration, while reducing the weight of the optical system L.

By forming each of the positive lens G1 and the positive lens G2 with a low dispersion material that satisfies Expressions (3-1) and (3-2), it is possible to accurately correct chromatic aberration in the first lens unit L1.

The ranges defined in Expressions (3-1) and (3-2) are preferably set to be ranges of Expressions (3-1a) and (3-2a) below, and more preferably set to be ranges of Expressions (3-1b) and (3-2b) below, respectively.

$$75.00<vdG1<98.00 \quad (3-1a)$$

$$75.00<vdG2<98.00 \quad (3-2a)$$

$$79.00<vdG1<96.00 \quad (3-1b)$$

$$79.00<vdG2<96.00 \quad (3-2b)$$

Though the positive lens G2 is arranged adjacent to the positive lens G1 on the image side in each of Embodiments, a negative lens may be provided between the positive lens G2 and the positive lens G1. However, when D12 is constant with respect to chromatic aberration correction, it is desired that an incident height of light on the positive lens G2 is set to be high. Moreover, in case of comparing a negative lens and a positive lens having equivalent effective diameters, the negative lens has a large volume in many cases, so that it is desired to reduce the effective diameter of the negative lens from a viewpoint of reduction of a weight. Accordingly, it is desired that the positive lens G2 is arranged adjacent to the positive lens G1 on the image side.

Moreover, when satisfying Expression (2) and Expression (3) (or Expression (3-1) and Expression (3-2)), the optical system L corrects chromatic aberration with good balance while reducing the diameter of the positive lens G2. In order to accurately correct chromatic aberration, it is desired that a positive lens G3 made of a low dispersion material is arranged on the image side of the positive lens G2. It is thereby possible to more accurately correct chromatic aberration. In addition, in a case where the positive lens G3 is provided, it is further desired that a positive lens G4 made of a low dispersion material is arranged on the image side of the positive lens G3. It is thereby possible to more accurately correct chromatic aberration.

Examples of the low dispersion material include S-FPL51 (which is manufactured by OHARA INC. and an Abbe number of which is 81.54), S-FPL55 (which is manufactured by OHARA INC. and an Abbe number of which is 94.66), S-FPL53 (which is manufactured by OHARA INC. and an Abbe number of which is 94.93), FCD1 (which is manufactured by HOYA CORPORATION and an Abbe number of which is 81.61), FCD10A (which is manufactured by HOYA CORPORATION and an Abbe number of which is 90.20), FCD10 (which is manufactured by HOYA CORPORATION and an Abbe number of which is 90.27), FCD100 (which is manufactured by HOYA CORPORATION and an Abbe number of which is 95.10), J-FK01A (which is manufactured by NIKON CORPORATION and an Abbe number of which is 81.65), J-FKH1 (which is manufactured by NIKON CORPORATION and an Abbe number of which is 82.57), and J-FKH2 (which is manufactured by NIKON CORPORATION and an Abbe number of which is 91.36). As the low dispersion material, fluorite ($CaF_2$) may be used.

Moreover, in order to accurately correct secondary spectra of chromatic aberration, it is desired that a positive lens GA made of a material having a great anomalous dispersion property is arranged on the image side of the positive lens G2. In a case where the positive lens G3 is provided, it is desired that the positive lens GA is provided on the image side of the positive lens G3. In a case where the positive lens G4 is further provided, it is desired that the positive lens G4 is provided on the image side of the positive lens GA. Thereby, it is possible to set effective diameters of the positive lens G3, the positive lens GA, and the positive lens G4 to have appropriate sizes, thus making it possible to configure the optical system L with a light weight while correcting primary chromatic aberration and secondary chromatic aberration with good balance.

In addition, in the optical system L of each of Embodiments, it is desired that the aperture diaphragm SP is provided between the first lens unit L1 and the second lens unit L2. It is thereby possible to reduce a diameter of a lens included in the second lens unit L2. Moreover, it is possible to reduce fluctuation on an aberration amount during focusing.

Further, it is desired that the second lens unit L2 has negative refractive power. This makes it possible to shorten the total length of the optical system L. Furthermore, it is desired that the second lens unit L2 is constituted by one negative lens. It is thereby possible to configure the second lens unit L2 with a light weight.

In the optical system L of each of Embodiments, an image stabilizing function may be included in a part of the lenses. That is, by moving the part of lenses (image stabilizing unit) of the optical system L in a direction including a component of a direction perpendicular to the optical axis at a time of image stabilization, it may be also possible to change an image forming position. It is thereby possible to perform image stabilization. In the optical system L of each of Embodiments, the entire lens unit of any one of the first lens unit L1, the second lens unit L2, and the third lens unit L3 may be the image stabilizing unit, or the image stabilizing unit may be provided in a part of the first lens unit L1, the second lens unit L2, and the third lens unit L3.

It is desired that the third lens unit L3 is constituted by a first partial lens unit L3A having positive refractive power, a second partial lens unit L3B having positive refractive power, and a third partial lens unit L3C in this order from the object side, and the second partial lens unit L3B is the image stabilizing unit. It is thereby possible to reduce a diameter of the image stabilizing unit and configure the optical system L so as to have a small size.

Moreover, it is desired that a cemented lens composed of a negative lens and a positive lens is arranged closest to the object side in the third lens unit L3. This makes it possible to achieve both correction of off-axis comatic aberration and correction of spherical aberration.

An arrow indicated by a broken line in each sectional view expresses a moving direction of the second partial lens unit L3B at a time of image stabilization.

It is desired that the optical system L of each of Embodiments does not include a diffractive optical element. In a case where the diffractive optical element is provided in the optical system L, although there is an advantage with respect to chromatic aberration correction, diffraction flare is caused in the diffractive optical element, so that it is not desired.

Furthermore, it is desired that the optical system L of each of Embodiments satisfies one of the following conditions or more.

$$0.600 < (R2+R1)/(R2-R1) < 0.500 \quad (4)$$

$$1.500 < fG1/fG2 < 3.000 \quad (5)$$

$$1.430 < ndA < 1.500 \quad (6)$$

$$24.00 < vdGN < 50.00 \quad (7)$$

$$0.540 < \theta gFGN < 0.595 \quad (8)$$

$$0.300 < f1/f < 0.600 \quad (9)$$

$$-2.800 < f1/f2 < -1.200 \quad (10)$$

$$0.200 < dFI/LD < 0.600 \quad (11)$$

$$73.00 < vdG3 \quad (12)$$

$$73.00 < vdG4 \quad (13)$$

$$-0.500 < fGN/fG1 < -0.150 \quad (14)$$

$$15.00 < vdGA < 30.00 \quad (15)$$

$$0.0150 < \theta gFGA - 0.6438 + 0.001682 \times vdGA < 0.1000 \quad (16)$$

Here, a curvature radius of the object-side lens surface of the positive lens G1 is denoted by R1, and a curvature radius of the image-side lens surface of the positive lens G1 is denoted by R2.

A focal length of the positive lens G1 is denoted by fG1, and a focal length of the positive lens G2 is denoted by fG2.

A value obtained by averaging a refractive index of the positive lens G1 and a refractive index of the positive lens G2 is denoted by ndA. That is, ndA is obtained by ndA=(ndG1+ndG2)/2, when the refractive index of the positive lens G1 is ndG1 and the refractive index of the positive lens G2 is ndG2.

An Abbe number of a negative lens GN arranged closest to the object side among negative lenses included in the first lens unit L1 is denoted by vdGN, and a partial dispersion ratio of the negative lens GN is denoted by θgFGN. In this case, a partial dispersion ratio (θgF) is an amount defined by Expression (B) below, when the refractive indexes of the F-line, the C-line, and a g-line of Fraunhofer lines are set as NF, NC, and Ng, respectively.

$$\theta gF = (Ng-NF)/(NF-NC) \quad (B)$$

A focal length of the first lens unit L1 is denoted by f1, and a focal length of the second lens unit L2 is denoted by f2.

A distance on the optical axis from a lens surface closest to the image side in the second lens unit L2 to the image plane in a state where the optical system L focuses at infinity is denoted by dFI.

An abbe number of the positive lens G3 is denoted by vdG3, and an Abbe number of the positive lens G4 is denoted by vdG4.

A focal length of the negative lens GN is denoted by fGN.

An Abbe number of the positive lens GA is denoted by vdGA, and a partial dispersion ratio of the positive lens GA is denoted by θgFGA.

Hereinafter, meanings of Expressions (4) to (16) will be described.

Expression (4) defines a shape factor of the positive lens G1, and is a condition for appropriately correcting spherical aberration. When the shape factor exceeds an upper limit of Expression (4), a meniscus shape of the positive lens G1 becomes strong, and distortion aberration is easily caused on a plus side in the positive lens G1, so that it is not desired. Moreover, when the shape factor exceeds the upper limit of Expression (4), manufacturing (molding) of the positive lens G1 becomes difficult.

When the shape factor falls below a lower limit of Expression (4), spherical aberration is likely to be excessively corrected in the entire optical system L, so that it is not desired.

Expression (5) is an expression defining a ratio of the focal length of the positive lens G1 and the focal length of the positive lens G2, and a condition for normalizing contribution to correction of spherical aberration and contribution to correction of axial chromatic aberration and for reducing the weight of the optical system L more.

When the value of fG1/fG2 exceeds an upper limit of Expression (5), refractive power of the positive lens G2 becomes too great with respect to refractive power of the positive lens G1, and it becomes difficult to achieve both sufficient correction of spherical aberration and axial chromatic aberration and sufficient reduction in the weight of the optical system L.

When the value of fG1/fG2 falls below a lower limit of Expression (5), the refractive power of the positive lens G1 becomes too great, and spherical aberration is likely to be excessively corrected in the entire optical system L, so that it is not desired.

Expression (6) is an expression prescribing the refractive indexes of the positive lens G1 and the positive lens G2, and a condition for reducing the size of the optical system L and reducing spherical aberration.

Because of a characteristic of an optical material, an Abbe number tends to become smaller as a refractive index becomes larger. When the refractive indexes of the positive lens G1 and the positive lens G2 become so great as to exceed an upper limit of Expression (6), although it is advantageous to suppress spherical aberration, insufficient correction of axial chromatic aberration or magnification chromatic aberration is easily caused, since the Abbe numbers become small. Accordingly, in order to perform suppression to achieve a desired amount of chromatic aberration, the refractive power of the positive lens G1 and the positive lens G2 is required to be weak, so that it becomes difficult to sufficiently reduce the weight of the optical system L. When the value of ndA fall below a lower limit of Expression (6), the refractive indexes of the positive lens G1 and the positive lens G2 become too small, so that it becomes difficult to perform sufficient aberration correction in the entire optical system L.

Expression (7) is an expression prescribing an Abbe number of the negative lens GN, and a condition for effectively reduce a generation amount of chromatic aberration in the first lens unit L1. When the value of vdGN exceeds an upper limit of Expression (7), refractive power of the negative lens GN, which is required to sufficiently correct chromatic aberration, becomes too great. Accordingly, curvature of a lens surface of the negative lens GN becomes large, resulting in that a generation amount of high order aberration increases. When the value of vdGN falls below a lower limit of Expression (7), although it is advantageous to reduce the size of the optical system L, dispersion of the negative lens GN becomes large, resulting in that variation in spherical aberration between wavelengths becomes great.

Expression (8) is an expression prescribing a partial dispersion ratio of the negative lens GN, and a condition for effectively reducing the generation amount of chromatic aberration in the first lens unit L1 by suppressing secondary spectra of axial chromatic aberration. When the partial dispersion ratio exceeds an upper limit of Expression (8), the value of θgFGN becomes too great, and it becomes difficult to sufficiently suppress the secondary spectra of axial chromatic aberration. Because of a characteristic of an optical material, an Abbe number tends to become larger, as a partial dispersion ratio becomes smaller. When the value of θgFGN below a lower limit of Expression (8), although it is advantageous to suppress the second spectra of axial chromatic aberration, the Abbe number of the negative lens GN easily becomes large, so that it becomes difficult to sufficiently perform correction of primary chromatic aberration.

Expression (9) is a condition that prescribes a ratio of the focal length of the first lens unit L1 and the focal length of the optical system L. When the focal length of the first lens unit L1 becomes so long as to exceed an upper limit of Expression (9), the refractive power of the first lens unit L1 becomes too weak, resulting in that the total length of the optical system L becomes long. When the focal length of the first lens unit L1 becomes so short as to fall below a lower limit of Expression (9), the refractive power of the first lens unit L1 becomes too great, and it becomes difficult to sufficiently correct spherical aberration or axial chromatic aberration, so that it is not desired.

Expression (10) is an expression prescribing a ratio of the focal lengths of the first lens unit L1 and the second lens unit L2 in a case where the second lens unit L2 has negative refractive power, and is a condition for appropriately reduce spherical aberration fluctuation due to focusing.

When the focal length of the first lens unit L1 becomes so short as to exceed an upper limit of Expression (10), since the refractive power of the first lens unit L1 becomes great, convergence of a light flux that enters the second lens unit L2 becomes great. Accordingly, in order to suppress fluctuation of various aberrations due to focusing, it is necessary to make the refractive power of the second lens unit L2 great, but, in this case, sensitivity to a manufacturing error of an amount of spherical aberration, which is caused in the second lens unit L2, becomes high, so that it is not desired. When the refractive power of the second lens unit L2 with respect to the refractive power of the first lens unit L1 becomes so great as to fall below a lower limit of Expression (10), although it is advantageous to shorten the total length, fluctuation of axial chromatic aberration due to focusing becomes great, so that it is not desired.

Expression (11) prescribes arrangement of the second lens unit L2. When the value of dFI/LD exceeds an upper limit of Expression (11), an incident height of a light beam entering the second lens unit L2 becomes high, and fluctuation of spherical aberration due to focusing becomes great. Moreover, fluctuation of comatic aberration due to decentration becomes great, so that it is not desired. When the value of dFI/LD falls below a lower limit of Expression (11), a moving amount of the second lens unit L2 during focusing increases, resulting in that the size of the optical system L increases.

Expression (12) prescribes dispersion of the positive lens G3, and is a condition for appropriately suppressing chromatic aberration caused in the first lens unit L1. When the Abbe number of the positive lens G3 becomes so small as to falls below a lower limit of Expression (12), an amount of chromatic aberration caused in the positive lens G3 increases, and it becomes difficult to sufficiently reduce chromatic aberration caused in the first lens unit L1.

Expression (13) prescribes dispersion of the positive lens G4, and is a condition for appropriately suppressing chromatic aberration caused in the first lens unit L1. When the Abbe number of the positive lens G4 becomes so small as to falls below a lower limit of Expression (13), an amount of chromatic aberration caused in the positive lens G4 increases, and it becomes difficult to sufficiently reduce chromatic aberration caused in the first lens unit L1.

Expression (14) prescribes a ratio of the focal lengths of the negative lens GN and the positive lens G1. When the focal length of the positive lens G1 becomes so long as to exceed an upper limit of Expression (14), the refractive power of the positive lens G1 becomes too weak. As a result, it becomes difficult to sufficiently converge light in the positive lens G1, and an effective diameter of a lens arranged on a side of the positive lens G1 becomes large, thus making it difficult to configure the optical system L so as to be light enough.

Moreover, the focal length of the positive lens G11 becomes so short as to fall below a lower limit of Expression (14), the refractive power of the positive lens G1 becomes too great, and chromatic aberration caused in the positive lens G1 increases, so that it is not desired. Further, the focal length of the negative lens GN becomes so long as to fall below the lower limit of Expression (14), the refractive power of the negative lens GN becomes too weak, resulting in that it becomes difficult to sufficiently correct chromatic aberration caused in the first lens unit L1.

Expression (15) prescribes the Abbe number of the material of the positive lens GA. When the value of vdGA exceeds an upper limit of Expression (15), an amount of chromatic aberration caused in the positive lens GA becomes insufficient, so that primary chromatic aberration in the first lens unit L1 is easily corrected excessively. As a result, the positive lens included in the first lens unit L1 is required to be arranged closer to the object side, thus making it difficult to sufficiently reduce the weight of the optical system L. Moreover, when the value of vdGA falls below a lower limit of Expression (15), primary chromatic aberration is excessively caused in the positive lens GA.

Expression (16) prescribes an anomalous dispersion property of the positive lens GA. An anomalous dispersion property will be described here. Expression (C) below defines $\Delta\theta gF$ that is an amount characterizing an anomalous dispersion property.

$$\Delta\theta F=\theta gF-(0.6438-0.001682\times vd) \quad (C)$$

In most of optical materials, a value of $\Delta\theta gF$ is a value near zero. As an absolute value of $\Delta\theta gF$ is larger, a material has a higher anomalous dispersion property. By arranging a positive lens formed by a material whose value of $\Delta\theta gF$ is large in a lens unit that has positive refractive power as a whole, it is possible to accurately correct secondary spectra of chromatic aberration. In description below, a value obtained by $\theta gFGA-0.6438+0.001682\times vdGA$ is expressed as $\Delta\theta gFGA$.

When the value of $\Delta\theta gFGA$ becomes so large as to exceed an upper limit of Expression (16), correction of secondary spectra of chromatic aberration in the first lens unit L1 easily becomes excessive. Moreover, when the value of $\Delta\theta gFGA$ becomes so small as to fall below a lower limit of Expression (16), it becomes difficult to sufficiently correct secondary spectra of chromatic aberration in the first lens unit L1.

Note that, it is desired that ranges of Expressions (4) to (16) are set as ranges of Expressions (4a) to (16a) below, respectively.

$$0.700<(R2+R1)/(R2-R1)<1.400 \quad (4a)$$

$$1.600<fG1/fG2<2.700 \quad (5a)$$

$$1.434<ndA<1.495 \quad (6a)$$

$$30.00<vdGN<45.00 \quad (7a)$$

$$0.550<\theta gFGN<0.592 \quad (5a)$$

$$0.350<f1/f<0.550 \quad (9a)$$

$$-2.300<f1/f2<-1.400 \quad (10a)$$

$$0.240<dFI/LD<0.500 \quad (11a)$$

$$82.00<vdG3 \quad (12a)$$

$$82.00<vdG4 \quad (13a)$$

$$-0.400<fGN/fG1<-0.200 \quad (14a)$$

$$16.00<vdGA<26.00 \quad (15a)$$

$$0.0180<gFGA-0.6438+0.001682\times vdGA<0.0800 \quad (16a)$$

Moreover, it is further desired that the ranges of Expressions (4a) to (16a) are set as ranges of Expressions (4b) to (16b) below, respectively.

$$0.770<(R2+R1)/(R2-R1)<1.310 \quad (4b)$$

$$1.700<fG1/fG2<2.500 \quad (5b)$$

$$1.436<ndA<1.490 \quad (6b)$$

$$33.00<vdGN<43.00 \quad (7b)$$

$$0.560<\theta gFGN<0.589 \quad (8b)$$

$$0.390<f1/f<0.480 \quad (9b)$$

$$-2.100<f1/f2<-1.500 \quad (10b)$$

$$0.300<dFI/LD<0.450 \quad (1b)$$

$$89.00<vdG3 \quad (12b)$$

$$89.00<vdG4 \quad (13b)$$

$$-0.350<fGN/fG1<-0.240 \quad (14b)$$

$$18.00<vdGA<23.00 \quad (15b)$$

$$0.0250<\theta gFGA-0.6438+0.001682\times vdGA<0.0600 \quad (16b)$$

Next, the optical system L of each of Embodiments 1 to 6 will be described.

The optical system L of Embodiment 1 is a telephoto-type optical system with an F-number of 2.9 and a half field angle of 4.2 degrees.

In the optical system L of Embodiment 1, neither the first lens unit L1 nor the third lens unit L3 moves during focusing. The second lens unit L2 has negative refractive power and moves to the image side during focusing from infinity to a short distance. In the optical system L of Embodiment 1, the third lens unit L3 has positive refractive power. The optical system L of Embodiment 1 satisfies Expression (3), Expression (3-1), and Expression (3-2).

The optical system L of Embodiment 2 is a telephoto-type optical system with an F-number of 2.9 and a half field angle of 4.2 degrees.

In the optical system L of Embodiment 2, neither the first lens unit L1 nor the third lens unit 13 moves during focusing. The second lens unit L2 has negative refractive power, and moves to the image side during focusing from infinity to a short distance. In the optical system L of Embodiment 2, the third lens unit L3 has positive refractive power. The optical system L of Embodiment 2 satisfies Expression (3).

The optical system L of Embodiment 3 is a telephoto-type optical system with an F-number of 2.9 and a half field angle of 3.2 degrees.

In the optical system L of Embodiment 3, neither the first lens unit L1 nor the third lens unit L3 moves during focusing. The second lens unit L2 has negative refractive power, and moves to the image side during focusing from infinity to a short distance. In the optical system L of Embodiment 3, the third lens unit L3 has positive refractive power. The optical system L of Embodiment 3 satisfies Expression (3), Expression (3-1), and Expression (3-2).

The optical system L of Embodiment 4 is a telephoto-type optical system with an F-number of 4.1 and a half field angle of 2.5 degrees.

In the optical system L of Embodiment 4, neither the first lens unit L1 nor the third lens unit L3 moves during focusing. The second lens unit L2 has negative refractive power, and moves to the image side during focusing from infinity to a short distance. In the optical system L of Embodiment 4, the third lens unit L3 has positive refractive power. The optical system L of Embodiment 4 satisfies Expression (3), Expression (3-1), and Expression (3-2).

The optical system L of Embodiment 5 is a telephoto-type optical system with an F-number of 4.1 and a half field angle of 2.1 degrees.

In the optical system L of Embodiment 5, neither the first lens unit L1 nor the third lens unit L3 moves during focusing. The second lens unit L2 has negative refractive power, and moves to the image side during focusing from infinity to a short distance. In the optical system L of Embodiment 5, the third lens unit L3 has negative refractive power. The optical system L of Embodiment 5 satisfies Expression (3), Expression (3-1), and Expression (3-2).

The optical system L of Embodiment 6 is a telephoto-type optical system with an F-number of 5.8 and a half field angle of 1.6 degrees.

In the optical system L of Embodiment 6, neither the first lens unit L1 nor the third lens unit L3 moves during focusing. The second lens unit L2 has negative refractive power, and moves to the image side during focusing from infinity to a short distance. In the optical system L of Embodiment 6, the third lens unit L3 has negative refractive power. The optical system L of Embodiment 6 satisfies Expression (3), Expression (3-1), and Expression (3-2).

Next, numerical embodiments 1 to 6 which respectively correspond to Embodiments 1 to 6 will be described. In each of the numerical embodiments, a surface number indicates order of an optical surface at a time of counting from the object side, and ri denotes a curvature radius of an i-th (i is a natural number) optical surface (i-th surface) and di denotes a gap between the i-th surface and an (i+1)th surface. A refractive index, an Abbe number, and a partial dispersion ratio of an i-th optical member are denoted by $ndi$, $vdi$, and $\theta gFi$, respectively. A gap between the second lens unit L2 and the aperture diaphragm SP and a gap between the second lens unit L2 and the third lens unit L3 are described as gaps during focusing at infinity.

In each of the numerical embodiments, back focus (BF) means a distance from a surface closest to the image side in the optical system L to the image plane, which is expressed by an air conversion length.

[Numerical embodiment 1]

unit mm
Surface data

| Surface number | r | d | nd | vd | θgF |
|---|---|---|---|---|---|
| 1 | 148.115 | 10.72 | 1.53775 | 74.70 | 0.5392 |
| 2 | 1742.774 | 94.09 | | | |
| 3 | 58.521 | 10.89 | 1.43700 | 95.10 | 0.5326 |
| 4 | 360.466 | 1.47 | | | |
| 5 | −10837.934 | 1.20 | 1.83400 | 37.34 | 0.5790 |
| 6 | 65.782 | 0.20 | | | |
| 7 | 54.916 | 9.60 | 1.43700 | 95.10 | 0.5326 |
| 8 | 314.968 | 5.14 | | | |
| 9 | 75.027 | 3.60 | 1.89286 | 20.36 | 0.6393 |
| 10 | 116.711 | 0.15 | | | |
| 11 | 43.149 | 1.40 | 1.83481 | 42.74 | 0.5648 |
| 12 | 28.266 | 10.81 | 1.43875 | 94.66 | 0.5340 |
| 13 | 118.020 | 5.24 | | | |
| 14 | (Aperture) ∞ | 3.70 | | | |
| 15 | 305.965 | 1.20 | 1.60300 | 65.44 | 0.5401 |
| 16 | 43.554 | 14.06 | | | |
| 17 | 108.935 | 1.20 | 1.89286 | 20.36 | 0.6393 |
| 18 | 57.999 | 4.12 | 1.49700 | 81.54 | 0.5375 |
| 19 | −176.044 | 4.42 | | | |
| 20 | 80.957 | 3.88 | 1.85025 | 30.05 | 0.5979 |
| 21 | −63.793 | 1.20 | 1.62299 | 58.16 | 0.5458 |
| 22 | 28.277 | 4.89 | | | |
| 23 | −48.817 | 1.20 | 1.77250 | 49.60 | 0.5520 |
| 24 | 97.543 | 3.71 | | | |
| 25 | 91.588 | 3.07 | 1.69895 | 30.13 | 0.6030 |
| 26 | −97.081 | 7.12 | | | |
| 27 | 55.208 | 1.20 | 1.94595 | 17.98 | 0.6544 |
| 28 | 38.877 | 5.66 | 1.66565 | 35.64 | 0.5824 |
| 29 | 1625.390 | 3.00 | | | |
| 30 | ∞ | 2.20 | 1.51633 | 64.14 | 0.5353 |
| 31 | ∞ | 59.46 | | | |
| Image plane | ∞ | | | | |

Various types of data

| | |
|---|---|
| Focal length | 294.00 |
| F-number | 2.91 |
| Half field angle (°) | 4.21 |
| Image height | 21.64 |
| Total lens length | 279.06 |
| BF | 63.92 |

Lens unit data

| Unit | Starting surface | Focal length |
|---|---|---|
| 1 | 1 | 130.02 |
| 2 | 15 | −84.36 |
| 3 | 17 | 646.35 |

[Numerical embodiment 2]

unit mm
Surface data

| Surface number | r | d | nd | vd | θgF |
|---|---|---|---|---|---|
| 1 | 144.139 | 12.48 | 1.48749 | 70.45 | 0.5303 |
| 2 | −3771.860 | 84.48 | | | |

-continued

[Numerical embodiment 2]

| | | | | | |
|---|---|---|---|---|---|
| 3 | 56.164 | 11.09 | 1.43700 | 95.10 | 0.5326 |
| 4 | 267.808 | 1.98 | | | |
| 5 | −15519.574 | 1.20 | 1.83400 | 37.16 | 0.5776 |
| 6 | 65.249 | 0.20 | | | |
| 7 | 55.105 | 10.07 | 1.43700 | 95.10 | 0.5326 |
| 8 | 396.078 | 7.78 | | | |
| 9 | 74.458 | 3.45 | 1.89286 | 20.36 | 0.6393 |
| 10 | 120.436 | 0.15 | | | |
| 11 | 43.412 | 1.40 | 1.83481 | 42.74 | 0.5648 |
| 12 | 27.736 | 10.63 | 1.43700 | 95.10 | 0.5326 |
| 13 | 117.105 | 4.77 | | | |
| 14 | (Aperture) ∞ | 3.39 | | | |
| 15 | 538.862 | 1.20 | 1.60300 | 65.44 | 0.5401 |
| 16 | 44.660 | 13.42 | | | |
| 17 | 111.499 | 1.20 | 1.89286 | 20.36 | 0.6393 |
| 18 | 57.899 | 4.21 | 1.49700 | 81.54 | 0.5375 |
| 19 | −154.116 | 5.37 | | | |
| 20 | 98.637 | 3.84 | 1.85025 | 30.05 | 0.5979 |
| 21 | −59.680 | 1.20 | 1.62299 | 58.16 | 0.5458 |
| 22 | 30.718 | 4.16 | | | |
| 23 | −47.743 | 1.20 | 1.77250 | 49.60 | 0.5520 |
| 24 | 96.745 | 4.65 | | | |
| 25 | 94.086 | 3.73 | 1.69895 | 30.13 | 0.6030 |
| 26 | −79.597 | 15.00 | | | |
| 27 | 56.160 | 1.20 | 1.94595 | 17.98 | 0.6544 |
| 28 | 38.997 | 6.67 | 1.66565 | 35.64 | 0.5824 |
| 29 | 487.453 | 5.25 | | | |
| 30 | ∞ | 2.20 | 1.51633 | 64.14 | 0.5353 |
| 31 | ∞ | 50.20 | | | |
| Image plane | ∞ | | | | |

Various types of data

| | |
|---|---|
| Focal length | 294.00 |
| F-number | 2.91 |
| Half field angle (°) | 4.21 |
| Image height | 21.64 |
| Total lens length | 277.03 |
| BF | 56.90 |

Lens unit data

| Unit | Starting surface | Focal length |
|---|---|---|
| 1 | 1 | 127.17 |
| 2 | 15 | −80.83 |
| 3 | 17 | 388.26 |

[Numerical embodiment 3]

unit mm
Surface data

| Surface number | r | d | nd | vd | θgF |
|---|---|---|---|---|---|
| 1 | 148.621 | 17.10 | 1.49700 | 81.54 | 0.5375 |
| 2 | 1138.319 | 123.64 | | | |
| 3 | 109.632 | 14.66 | 1.43700 | 95.10 | 0.5326 |
| 4 | −189.750 | 0.17 | | | |
| 5 | −182.545 | 1.50 | 1.80610 | 33.27 | 0.5881 |
| 6 | 119.511 | 2.32 | | | |
| 7 | 111.412 | 7.70 | 1.43700 | 95.10 | 0.5326 |
| 8 | ∞ | 16.58 | | | |
| 9 | 68.556 | 5.05 | 1.89286 | 20.36 | 0.6393 |
| 10 | 121.351 | 1.66 | | | |
| 11 | 68.864 | 2.00 | 1.83400 | 37.16 | 0.5776 |
| 12 | 39.664 | 10.51 | 1.43700 | 95.10 | 0.5326 |
| 13 | 133.146 | 6.92 | | | |
| 14 | (Aperture) ∞ | 5.00 | | | |
| 15 | −523.636 | 1.60 | 1.61800 | 63.40 | 0.5395 |
| 16 | 63.654 | 37.38 | | | |
| 17 | 122.478 | 1.40 | 1.89286 | 20.36 | 0.6393 |
| 18 | 76.313 | 6.79 | 1.51742 | 52.43 | 0.5564 |
| 19 | −91.427 | 1.00 | | | |
| 20 | 96.309 | 4.44 | 1.80610 | 33.27 | 0.5881 |
| 21 | −140.978 | 1.20 | 1.53775 | 74.70 | 0.5392 |
| 22 | 37.054 | 5.21 | | | |
| 23 | −94.207 | 1.20 | 1.72916 | 54.68 | 0.5444 |
| 24 | 70.291 | 3.83 | | | |
| 25 | 150.127 | 5.11 | 1.65412 | 39.68 | 0.5737 |
| 26 | −379.585 | 6.25 | | | |
| 27 | 66.985 | 9.67 | 1.72047 | 34.71 | 0.5834 |
| 28 | −75.079 | 1.50 | 1.80810 | 22.76 | 0.6307 |
| 29 | 38384.468 | 3.00 | | | |
| 30 | ∞ | 2.20 | 1.51633 | 64.14 | 0.5353 |
| 31 | ∞ | 65.42 | | | |
| Image plane | ∞ | | | | |

Various types of data

| | |
|---|---|
| Focal length | 392.00 |
| F-number | 2.90 |
| Half field angle (°) | 3.16 |
| Image height | 21.64 |
| Total lens length | 371.26 |
| BF | 69.88 |

Lens unit data

| Unit | Starting surface | Focal length |
|---|---|---|
| 1 | 1 | 187.58 |
| 2 | 15 | −91.74 |
| 3 | 17 | 271.39 |

[Numerical embodiment 4]

unit mm
Surface data

| Surface number | r | d | nd | vd | θgF |
|---|---|---|---|---|---|
| 1 | 201.829 | 12.65 | 1.43875 | 94.66 | 0.5340 |
| 2 | −2584.782 | 145.60 | | | |
| 3 | 99.230 | 10.81 | 1.43875 | 94.66 | 0.5340 |
| 4 | −674.848 | 0.62 | | | |
| 5 | −421.257 | 1.85 | 1.83481 | 42.73 | 0.5648 |
| 6 | 153.735 | 0.11 | | | |
| 7 | 80.555 | 8.63 | 1.43875 | 94.66 | 0.5340 |
| 8 | 368.255 | 28.36 | | | |
| 9 | 74.699 | 2.90 | 2.00272 | 19.32 | 0.6451 |
| 10 | 98.791 | 0.15 | | | |
| 11 | 78.098 | 2.10 | 1.83481 | 42.74 | 0.5648 |
| 12 | 38.833 | 8.54 | 1.43700 | 95.10 | 0.5326 |
| 13 | 135.622 | 12.05 | | | |
| 14 | (Aperture) ∞ | 3.76 | | | |
| 15 | 750.127 | 1.60 | 1.59522 | 67.74 | 0.5442 |
| 16 | 70.990 | 30.80 | | | |
| 17 | 293.983 | 1.30 | 1.89286 | 20.36 | 0.6393 |
| 18 | 47.430 | 4.93 | 1.80610 | 33.27 | 0.5881 |
| 19 | −203.081 | 13.38 | | | |
| 20 | 96.113 | 4.04 | 1.66680 | 33.05 | 0.5957 |
| 21 | −51.209 | 1.30 | 1.59522 | 67.74 | 0.5442 |
| 22 | 50.541 | 2.76 | | | |
| 23 | −130.758 | 1.10 | 1.77250 | 49.60 | 0.5520 |
| 24 | 65.161 | 4.17 | | | |
| 25 | 75.415 | 2.87 | 1.76182 | 26.52 | 0.6136 |
| 26 | −562.596 | 32.03 | | | |
| 27 | 67.718 | 4.61 | 1.66565 | 35.64 | 0.5824 |
| 28 | −1350.843 | 1.50 | 1.92286 | 20.88 | 0.6391 |
| 29 | 142.992 | 5.00 | | | |
| 30 | ∞ | 2.20 | 1.51633 | 64.14 | 0.5353 |
| 31 | ∞ | 59.42 | | | |
| Image plane | ∞ | | | | |

[Numerical embodiment 4]

Various types of data

| | |
|---|---|
| Focal length | 490.00 |
| F-number | 4.12 |
| Half field angle (°) | 2.53 |
| Image height | 21.64 |
| Total lens length | 410.40 |
| BF | 65.87 |

Lens unit data

| Unit | Starting surface | Focal length |
|---|---|---|
| 1 | 1 | 227.67 |
| 2 | 15 | −131.85 |
| 3 | 17 | 1091.90 |

[Numerical embodiment 5]

unit mm
Surface data

| Surface number | r | d | nd | νd | θgF |
|---|---|---|---|---|---|
| 1 | 222.557 | 15.51 | 1.43700 | 95.10 | 0.5326 |
| 2 | −3824.156 | 175.33 | | | |
| 3 | 134.212 | 14.56 | 1.43700 | 95.10 | 0.5326 |
| 4 | −221.492 | 1.60 | 1.83400 | 37.34 | 0.5790 |
| 5 | 227.294 | 0.15 | | | |
| 6 | 89.690 | 10.58 | 1.43700 | 95.10 | 0.5326 |
| 7 | 390.632 | 45.04 | | | |
| 8 | 72.359 | 4.31 | 1.84666 | 23.88 | 0.6218 |
| 9 | 120.365 | 0.15 | | | |
| 10 | 94.171 | 2.00 | 1.80420 | 46.50 | 0.5572 |
| 11 | 39.335 | 9.66 | 1.43700 | 95.10 | 0.5326 |
| 12 | 224.353 | 6.34 | | | |
| 13 | (Aperture) ∞ | 3.46 | | | |
| 14 | 424.882 | 1.60 | 1.59349 | 67.00 | 0.5361 |
| 15 | 61.828 | 36.05 | | | |
| 16 | 235.251 | 1.50 | 1.89286 | 20.36 | 0.6393 |
| 17 | 45.626 | 5.13 | 1.73800 | 32.26 | 0.5899 |
| 18 | −271.653 | 1.00 | | | |
| 19 | 76.505 | 3.93 | 1.80518 | 25.46 | 0.6156 |
| 20 | −115.862 | 1.30 | 1.59349 | 67.00 | 0.5361 |
| 21 | 42.193 | 4.09 | | | |
| 22 | −98.620 | 1.30 | 1.81600 | 46.62 | 0.5568 |
| 23 | 88.001 | 3.82 | | | |
| 24 | 71.537 | 2.98 | 1.85478 | 24.80 | 0.6122 |
| 25 | −1313.720 | 45.91 | | | |
| 26 | 91.008 | 9.19 | 1.66565 | 35.64 | 0.5824 |
| 27 | −79.552 | 1.50 | 1.89286 | 20.36 | 0.6393 |
| 28 | 286.749 | 5.00 | | | |
| 29 | ∞ | 2.20 | 1.51633 | 64.14 | 0.5353 |
| 30 | ∞ | 60.35 | | | |
| Image plane | ∞ | | | | |

Various types of data

| | |
|---|---|
| Focal length | 588.00 |
| F-number | 4.12 |
| Half field angle (°) | 2.11 |
| Image height | 21.64 |
| Total lens length | 474.78 |
| BF | 66.80 |

Lens unit data

| Unit | Starting surface | Focal length |
|---|---|---|
| 1 | 1 | 235.16 |
| 2 | 14 | −122.12 |
| 3 | 16 | −3240.07 |

[Numerical embodiment 6]

unit mm
Surface data

| Surface number | r | d | nd | νd | θgF |
|---|---|---|---|---|---|
| 1 | 223.003 | 14.48 | 1.53775 | 74.70 | 0.5392 |
| 2 | −3450.162 | 138.02 | | | |
| 3 | 113.049 | 13.26 | 1.43700 | 95.10 | 0.5326 |
| 4 | −327.029 | 0.22 | | | |
| 5 | −301.122 | 1.50 | 1.83400 | 37.34 | 0.5790 |
| 6 | 130.462 | 0.64 | | | |
| 7 | 88.571 | 10.07 | 1.43700 | 95.10 | 0.5326 |
| 8 | 498.274 | 42.23 | | | |
| 9 | 84.302 | 3.64 | 1.89286 | 20.36 | 0.6393 |
| 10 | 128.304 | 0.50 | | | |
| 11 | 94.662 | 2.00 | 1.77250 | 49.60 | 0.5520 |
| 12 | 43.939 | 8.71 | 1.43387 | 95.10 | 0.5373 |
| 13 | 131.943 | 12.59 | | | |
| 14 | (Aperture) ∞ | 9.83 | | | |
| 15 | 1362.772 | 1.50 | 1.60311 | 60.64 | 0.5415 |
| 16 | 85.457 | 42.15 | | | |
| 17 | 132.671 | 1.20 | 1.89286 | 20.36 | 0.6393 |
| 18 | 34.498 | 6.06 | 1.63980 | 34.46 | 0.5922 |
| 19 | −136.656 | 1.00 | | | |
| 20 | 76.687 | 4.33 | 1.76182 | 26.52 | 0.6136 |
| 21 | −71.885 | 1.20 | 1.72916 | 54.68 | 0.5444 |
| 22 | 40.105 | 4.02 | | | |
| 23 | −77.013 | 1.20 | 1.76385 | 48.51 | 0.5587 |
| 24 | 273.973 | 6.94 | | | |
| 25 | 52.952 | 3.83 | 1.67270 | 32.10 | 0.5988 |
| 26 | −282.362 | 55.89 | | | |
| 27 | −45.375 | 1.20 | 1.43875 | 94.66 | 0.5340 |
| 28 | 46.056 | 8.45 | 1.59551 | 39.24 | 0.5803 |
| 29 | −30.267 | 1.30 | 1.92286 | 20.88 | 0.6391 |
| 30 | −67.314 | 5.68 | | | |
| 31 | ∞ | 2.20 | 1.51633 | 64.14 | 0.5353 |
| 32 | ∞ | 77.45 | | | |
| Image plane | ∞ | | | | |

Various types of data

| | |
|---|---|
| Focal length | 784.00 |
| F-number | 5.80 |
| Half field angle (°) | 1.58 |
| Image height | 21.64 |
| Total lens length | 482.54 |
| BF | 84.58 |

Lens unit data

| Unit | Starting surface | Focal length |
|---|---|---|
| 1 | 1 | 284.80 |
| 2 | 15 | −151.24 |
| 3 | 17 | −494.85 |

Various values in each of Embodiments are indicated in a table below.

TABLE 1

|  | Embodiment 1 | Embodiment 2 | Embodiment 3 | Embodiment 4 | Embodiment 5 | Embodiment 6 |
| --- | --- | --- | --- | --- | --- | --- |
| (1) LD/f | 0.949 | 0.942 | 0.947 | 0.838 | 0.807 | 0.615 |
| (2) D12/LD | 0.480 | 0.305 | 0.333 | 0.355 | 0.369 | 0.286 |
| (3) vdA | 84.90 | 82.78 | 88.32 | 94.66 | 95.10 | 84.90 |
| (3-1) vdG1 | 74.70 | — | 81.54 | 94.66 | 95.10 | 74.70 |
| (3-2) vdG2 | 95.10 | — | 95.10 | 94.66 | 95.10 | 95.10 |
| (4) (R2 + R1)/(R2 − R1) | 0.775 | 0.926 | 1.300 | 0.855 | 0.890 | 0.879 |
| (5) fG1/fG2 | 1.899 | 1.781 | 2.119 | 2.158 | 2.488 | 2.010 |
| (6) ndA | 1.487 | 1.462 | 1.467 | 1.439 | 1.437 | 1.487 |
| (7) vdGN | 37.34 | 37.16 | 33.27 | 42.73 | 37.34 | 37.34 |
| (8) θgFGn | 0.579 | 0.578 | 0.588 | 0.565 | 0.579 | 0.579 |
| (9) f1/f | 0.442 | 0.433 | 0.479 | 0.465 | 0.400 | 0.363 |
| (10) f1/f2 | −1.541 | −1.573 | −2.045 | −1.727 | −1.926 | −1.883 |
| (11) dFI/LD | 0.429 | 0.443 | 0.417 | 0.416 | 0.389 | 0.463 |
| (12) vdG3 | 95.10 | 95.10 | 95.10 | 94.66 | 95.10 | 95.10 |
| (13) vdG4 | 94.66 | 95.10 | 95.10 | 95.10 | 95.10 | 95.10 |
| (14) fGN/fG1 | −0.261 | −0.273 | −0.261 | −0.315 | −0.279 | −0.279 |
| (15) vdGA | 20.36 | 20.36 | 20.36 | 19.32 | 23.88 | 20.36 |
| (16) ΔθgFGA | 0.0297 | 0.0297 | 0.0297 | 0.0338 | 0.0182 | 0.0297 |

[Imaging Apparatus]

Figure 13:
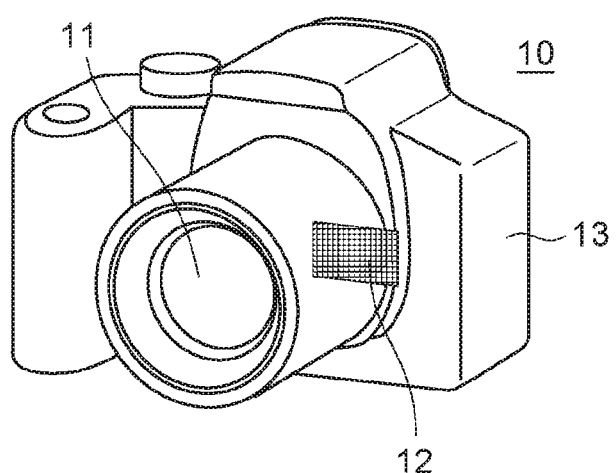
FIG. 13 is a schematic view of an imaging apparatus.

Next, an embodiment of an imaging apparatus of the disclosure will be described. FIG. 13 is a schematic view of an imaging apparatus (digital still camera) 10 of the present embodiment. The imaging apparatus 10 includes a camera main body 13, an optical system 11 that is similar to any one of those of Embodiments 1 to 6 described above, and a light-receiving element (image sensor) 12 that performs photoelectric conversion for an image formed by the optical system 11.

The imaging apparatus 10 of the present embodiment is able to obtain a high-quality image that is formed by the optical system 11 in which aberration such as chromatic aberration has been accurately corrected. Moreover, since the optical system 11 has a light weight, it is possible to make an entirety of the imaging apparatus 10 have a light weight.

Note that, as the light-receiving element 12, an image sensor such as a CCD or a CMOS sensor may be used. At this time, by electrically correcting various aberrations of an image acquired by the light-receiving element 12, such as distortion aberration or chromatic aberration, it is also possible to enhance image quality of an output image.

The above-described optical system L of each of Embodiments can be applied not only to the digital still camera illustrated in FIG. 13, but also to various types of optical equipment such as a silver-halide-film camera, a video camera, or a telescope.

As above, a suitable exemplary embodiment and Embodiments of the disclosure have been described, but the disclosure is not limited to the exemplary embodiment and Embodiments, and various combinations, modifications, and changes may be possible within the scope of the gist.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-188935 filed Sep. 28, 2017, which is hereby incorporated by reference herein in its entirety.

What is claimed is:

1. An optical system comprising:
    a positive lens G1 arranged closest to an object side of all lenses within the optical system; and
    a positive lens G2 arranged closest to the object side among a plurality of positive lenses at an image side of the positive lens G1,
    wherein the optical system satisfies the following conditions:

$LD/f < 1.000$ $82.73 < vdA$ $0.200 < D12/LD < 0.600$ where LD is a distance on an optical axis from an object-side surface of the positive lens G1 to an image plane of the optical system, f is a focal length of the optical system, vdA is a value obtained by averaging an Abbe number of the positive lens G1 and an Abbe number of the positive lens G2, and D12 is a distance on the optical axis from a lens arranged adjacent to the positive lens G1 on the image side to the positive lens G1.

2. The optical system according to claim 1, wherein the positive lens G2 is arranged as the most adjacent lens to the positive lens G1 on the image side.

3. The optical system according to claim 1, wherein the optical system further satisfies the following condition:

$0.600 < (R2+R1)/(R2-R1) < 1.500$ where R1 is a curvature radius of an object-side lens surface of the positive lens G1, and R2 is a curvature radius of an image-side lens surface of the positive lens G1.

4. The optical system according to claim 1, wherein the optical system further satisfies the following condition:

$1.500 < fG1/fG2 < 3.000$ where fG1 is a focal length of the positive lens G1, and fG2 is a focal length of the positive lens G2.

5. The optical system according to claim 1, wherein the optical system further satisfies following condition:

$1.430 < ndA < 1.500$ where ndA is a value obtained by averaging a refractive index of the positive lens G1 and a refractive index of the positive lens G2.

6. The optical system according to claim 1, further including at least one negative lens, wherein the optical system satisfies the following condition:

$24.00 < vdGN < 50.00$ where vdGN is an Abbe number of a negative lens GN that is arranged closest to the object side among all negative lenses included in the optical system.

7. The optical system according to claim 6, wherein the optical system satisfies the following condition:

$$0.540 < \theta gFGN < 0.595$$

where θgFGN is a partial dispersion ratio of the negative lens GN.

8. The optical system according to claim 1, further comprising
a first lens unit having positive refractive power, a second lens unit, and a third lens unit arranged in order from the object side to the image side,
wherein, during focusing, the second lens moves and a gap between each pair of adjacent lens units changes, and
wherein both the positive lens G1 and the positive lens G2 are provided in the first lens unit.

9. The optical system according to claim 8, wherein the optical system satisfies the following condition:

$$0.300 < f1/f < 0.600$$

where f1 is a focal length of the first lens unit, and f is the focal length of the optical system.

10. The optical system according to claim 8, wherein the optical system satisfies the following condition:

$$-2.800 < f1/f2 < -1.200$$

where f1 is a focal length of the first lens unit, and f2 is a focal length of the second lens unit.

11. The optical system according to claim 8, wherein the optical system satisfies the following condition:

$$0.200 < dFI/LD < 0.600$$

where dFI is a distance on the optical axis from a lens surface closest to the image side in the second lens unit to the image plane in a state where the optical system focuses at infinity.

12. The optical system according to claim 8, wherein the first lens unit includes a positive lens G3 arranged on the image side of the positive lens G2, and
wherein the optical system satisfies the following condition:

$$75.00 < vdG3$$

where vdG3 is an Abbe number of the positive lens G3.

13. The optical system according to claim 12,
wherein the first lens unit includes a positive lens G4 arranged on the image side of the positive lens G3, and
wherein the optical system satisfies the following condition:

$$75.00 < vdG4$$

where vdG4 is an Abbe number of the positive lens G4.

14. The optical system according to claim 8,
wherein the first lens unit includes at least one negative lens, and
wherein the optical system satisfies the following condition:

$$-0.500 < fGN/fG1 < -0.150$$

where fGN is a focal length of a negative lens GN that is arranged closest to the object side among all negative lenses included in the first lens unit, and fG1 is a focal length of the positive lens G1.

15. The optical system according to claim 8,
wherein the first lens unit includes a positive lens GA arranged on the image side of the positive lens G2, and
wherein the optical system satisfies the following condition:

$$15.00 < vdGA < 30.00$$

$$0.0150 < \theta gFGA - 0.6438 + 0.001682 \times vdGA < 0.1000$$

where vdGA is an Abbe number of the positive lens GA, and θgFGA is a partial dispersion ratio of the positive lens GA.

16. The optical system according to claim 8, wherein the second lens unit has negative refractive power.

17. The optical system according to claim 16, wherein the second lens unit consists of one negative lens.

18. The optical system according to claim 8,
wherein the third lens unit consists of a first partial lens unit having positive refractive power, a second partial lens unit having positive refractive power, and a third partial lens unit that are provided in order from the object side to the image side, and
wherein the second partial lens unit moves in a direction including a component of a direction perpendicular to the optical axis at a time of image stabilization.

19. An optical system comprising:
a positive lens G1 arranged closest to an object side of all lenses within the optical system; and
a positive lens G2 arranged closest to the object side among a plurality of positive lenses at an image side of the positive lens G1,
wherein the optical system satisfies the following conditions:

$$LD/f < 1.000$$

$$73.00 < vdG1$$

$$73.00 < vdG2$$

$$0.200 < D12/LD < 0.600$$

where LD is a distance on an optical axis from an object-side surface of the positive lens G1 to an image plane of the optical system, f is a focal length of the optical system, vdG1 is an Abbe number of the positive lens G1, vdG2 is an Abbe number of the positive lens G2, and D12 is a distance on the optical axis from a lens arranged adjacent to the positive lens G1 on the image side to the positive lens G1.

20. An imaging apparatus comprising: an optical system; and an image sensor that receives light of an image formed by the optical system,
wherein the optical system includes
a positive lens G1 arranged closest to an object side of all lenses within the optical system, and
a positive lens G2 arranged closest to the object side among a plurality of positive lenses at an image side of the positive lens G1, and
wherein the optical system satisfies the following conditions:

$$LD/f < 1.000$$

$$82.73 < vdA$$

$$0.200 < D12/LD < 0.600$$

where LD is a distance on an optical axis from an object-side surface of the positive lens G1 to an image plane of the optical system, f is a focal length of the optical system, vdA is a value obtained by averaging an Abbe number of the positive lens G1 and an Abbe number of the positive lens G2, and D12 a distance on the optical axis from a lens arranged adjacent to the positive lens G1 on the image side to the positive lens G1.

* * * * *